United States Patent
Gnanaprakasam et al.

(10) Patent No.: US 12,210,494 B2
(45) Date of Patent: Jan. 28, 2025

(54) DATA MANAGEMENT ECOSYSTEM FOR DATABASES

(71) Applicant: Capital One Services, LLC, McLean, VA (US)

(72) Inventors: Hari Hara Sudhan Gnanaprakasam, Glen Allen, VA (US); Yudhish Batra, McLean, VA (US); Nagender Gurram, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 61 days.

(21) Appl. No.: 17/837,818

(22) Filed: Jun. 10, 2022

(65) Prior Publication Data

US 2023/0401181 A1    Dec. 14, 2023

(51) Int. Cl.
*G06F 16/21* (2019.01)
*G06F 16/22* (2019.01)
*G06F 16/28* (2019.01)

(52) U.S. Cl.
CPC ........ *G06F 16/214* (2019.01); *G06F 16/2282* (2019.01); *G06F 16/283* (2019.01)

(58) Field of Classification Search
CPC ... G06F 16/214; G06F 16/2282; G06F 16/283
See application file for complete search history.

(56) References Cited

U.S. PATENT DOCUMENTS

| | | | |
|---|---|---|---|
| 10,970,303 B1 | 4/2021 | Denton et al. | |
| 10,997,147 B2 * | 5/2021 | Yan | G06F 16/278 |
| 10,997,163 B2 * | 5/2021 | Dageville | G06F 16/2386 |
| 11,269,734 B2 * | 3/2022 | Ramohalli Gopala Rao | G06F 11/203 |

(Continued)

FOREIGN PATENT DOCUMENTS

CN    114416783 A    4/2022

OTHER PUBLICATIONS

Aug. 16, 2021, VentureBeat, Lazzaro, "How to migrate to Snowflake without getting 'data drunk'," <<https://venturebeat.com/2021/08/16/how-to-migrate-to-snowflake-without-getting-data-drunk/>>, 8 pages.

(Continued)

*Primary Examiner* — Miranda Le
(74) *Attorney, Agent, or Firm* — Banner & Witcoff, Ltd.

(57) ABSTRACT

Systems as described herein may implement a data management ecosystem for databases. A computing device may receive, from a first user device, a request to migrate one or more data objects from a sandbox to a production environment. The production environment may include a plurality of data warehouses that may be provided as a service in a cloud computing environment, and computing resources are dynamically allocated to the plurality of data warehouses. The computing device may determine lineage information and update a database catalog of the data warehouses with the lineage information. The computing device may identify sensitive data contained within the one or more data objects and generate tokenization for the sensitive data. Based on the lineage information in the database catalog and the tokenization, the computing device may generate a migration plan and cause the at least one of the plurality of data warehouses to execute the migration plan.

18 Claims, 8 Drawing Sheets

(56) References Cited

U.S. PATENT DOCUMENTS

| | | | |
|---|---|---|---|
| 11,334,589 B2* | 5/2022 | Mehta | G06F 16/951 |
| 11,397,744 B2* | 7/2022 | Wan | G06N 20/00 |
| 11,418,577 B1* | 8/2022 | Chu | H04L 67/1097 |
| 11,487,778 B1* | 11/2022 | Dageville | G06F 16/2282 |
| 11,609,986 B2* | 3/2023 | Khurana | G06F 21/6254 |
| 2006/0056626 A1* | 3/2006 | Keohane | G06F 21/84 726/16 |
| 2012/0131591 A1 | 5/2012 | Moorthi et al. | |
| 2012/0310875 A1 | 12/2012 | Prahlad et al. | |
| 2013/0117305 A1 | 5/2013 | Varakin et al. | |
| 2014/0006384 A1 | 1/2014 | Jerzak et al. | |
| 2014/0089495 A1 | 3/2014 | Akolkar et al. | |
| 2016/0140544 A1* | 5/2016 | Howe | G06Q 20/383 705/74 |
| 2016/0350747 A1* | 12/2016 | Pruthi | G06Q 20/108 |
| 2017/0076281 A1* | 3/2017 | Dawkins | G06Q 20/10 |
| 2019/0370058 A1* | 12/2019 | Gupta | G06F 9/466 |
| 2020/0167323 A1 | 5/2020 | Swamy et al. | |
| 2020/0272347 A1* | 8/2020 | Bedadala | G06F 3/0605 |
| 2021/0089560 A1 | 3/2021 | Funke et al. | |
| 2021/0334283 A1 | 10/2021 | Gladwin et al. | |
| 2021/0390095 A1* | 12/2021 | Muralidhar | G06F 3/0605 |
| 2021/0390884 A1* | 12/2021 | Bush | H04L 9/0861 |

OTHER PUBLICATIONS

Nadilytics—The Intelligence Platform on top of Snowflake. Retreived from https://www.nadilytics.com/, retrieved online May 14, 2021, at 4:25:15 pm.

Snowflake for Data Sharing, Snowflake Workloads, <https://www.snowflake.com/workloads/data-sharing/>>, date of publication unknown but, prior to Jul. 13, 2021, 3 pages, published Aug. 2020.

Data Governance is Worth the Time and Trouble, <<https://www.snowflake.com/trending/data-governance-framework>>, date of publication unknown but, prior to Jul. 13, 2021, 14 pages.

Working with Secuve Views, Snowflake Documention, <<https://docs.snowflake.com/en/user-guide/views-secure.html>>, date of publication unknown but, prior to Jul. 13, 2021, 3 pages, published Aug. 2020.

Data governance with Snowflake: 3 things you need to know, <<https://www.talend.com/resources/data-governance-snowflake-3-things-to-know/, date of publication unknown but, prior to Jul. 13, 2021, 11 pages.

GPDR: A quick way to reduce scope, <<https://www.talend.com/resources/anonymize-data/>>, date of publication unknown but, prior to Jul. 13, 2021, 6 pages.

Jun. 14, 2019, Mushtaq, Data preprocessing in detail, <<https://developer.ibm.com/technologies/data-science/articles/data-preprocessing-in-detail/>>, 9 pages.

Wikipedia, Data pre-processing, <<https://en.wikipedia.org/wiki/Data_pre-processing>>, date of publication but, prior to Jul. 13, 2021, 4 pages.

Snowflake Data Exchange, <<https://resources.snowflake.com/solution-briefs/data-exchange-solution-brief>>, date of publication unknown but, prior to Jul. 13, 2021, 2 pages.

Zhao, et al., "SLA-based Profit Optimization Resource Scheduling for Big Data Analytics-as-a-Service Platforms in Cloud Computing Environments," IEEE Transactions on Cloud Computing, Dec. 27, 2018.

Steve Swoyer "Automating the Modern Data Warehouse" XP093075010, https://www.oracle.com/au/a/ocom/docs/cloud/oreilly-automating-modern-data-warehouse.pdf, Mar. 4, 2021, pp. 1-66.

Aug. 29, 2023—(WO) International Search Report and Written Opinion—App No. PCT/US2023/024816.

* cited by examiner

FIG. 6B

DATA MANAGEMENT ECOSYSTEM FOR DATABASES

FIELD OF USE

Aspects of the disclosure relate generally to data storage and retrieval. More specifically, aspects of the disclosure relate to a data processing and management process for implementing data governance and control on a cloud database platform that provides access to shared databases.

BACKGROUND

Cloud database platforms such as the Snowflake architecture, produced by Snowflake Inc. of San Mateo, CA, permit organizations to logically separate but natively integrate storage, computing, and services. Snowflake and similar "data warehouse as a service" platforms may provide users access to cloud database storage, whereby storage of data is maintained in separate servers. This process allows data creators to share their data with a wide variety of consumers. Given the complexity and size of many data warehouses, the task of executing queries and collecting the results of those queries is often tasked to computing devices specially configured for that purpose. Such computing devices may be, as is the case with Snowflake, one or more servers which may instantiate virtual warehouses for a user to conduct searches within. This process also allows users and companies to offload complex and expensive data warehousing and query operations to a cloud provider. For example, a user seeking to query a multi-terabyte data warehouse may, rather than trying to execute the query and collect results on their laptop, send instructions to a virtual warehouse in the cloud that causes one or more servers to, via a virtual warehouse, perform the query on their behalf. This allows the user to access the results of the data (e.g., in a user interface) from a relatively underpowered computing device. As such, systems like Snowflake have numerous benefits: they lower the processing burden on individual users' computers when conducting queries, they lower the network bandwidth required for such queries (as, after all, data need not be downloaded to the user's computer), and they (in many cases) speed up the overall query process significantly.

In addition to avoiding resource limitations associated with queries, another advantage of the Snowflake architecture is that it allows users to collect data in a way that is resilient. Because a user's laptop may be relatively underpowered, queries that request significant amounts of data may crash the laptop. Moreover, because a single device collects the results of a query, unexpected technical issues (e.g., power loss, Internet disconnects) may cause the entire query to fail. The Snowflake architecture is equipped with built-in replication and failover/failback procedures which avoid such crashes, thereby ensuring that data continuity may be preserved. That said, such robustness can come with a caveat: because the Snowflake architecture can handle larger and more robust queries, a user may submit a malformed or overly broad query and thereby inadvertently cause a virtual warehouse to spend considerable time and computing resources.

One way in which the Snowflake architecture improves conventional query execution is that Snowflake allows virtual warehouses to be created, modified, and destroyed as desired. This allows multiple queries to be executed simultaneously but separately. For example, the Snowflake architecture allows a first user from an organization to execute a first query in a first virtual warehouse at the same time that a second user from the same organization executes a second query in a second virtual warehouse. To preserve computing resources, the different virtual warehouses may be configured with different computing resources.

One useful feature in Snowflake is the ability to share data without needing to copy that data over from one storage device for another. This process might be referred to as a "zero copy" process, referring to the fact that the underlying data need not be copied for it to be shared. For example, an owner of data (which might also be referred to as a data producer and/or data creator) might sell access to all or portions of their data to one or more consumers, such that the one or more consumers might use virtual warehouses to access and execute queries against that data. In this manner, the consumers gain quick and easy access to the data, while the owner maintains control of the data. Advantageously, this means that needless copies of the data are not created, which means that updates to the data are available to all users.

One concern with Snowflake's data sharing functionality is that conventional systems may perform some routine tasks on data analysis and transformation to produce a new set of data. However, these systems lack an integrated implementation for lineage tracking and quality monitoring for shared data in the data transformation process. These systems may also be deficient in providing a data governing process on how data might graduate from one environment (e.g., a user space) to another (e.g., a production environment). In particular, the management of the privacy and security for sensitive data in the data sharing process, such as personal data comprising, for example, payment card information (PCI), nonpublic personal information (NPI), and/or personal health information (PHI), may be compromised. As such, conventional systems may fail to provide a robust mechanism to manage the migration, lineage and validation of shared data in a cloud database platform.

Aspects described herein may address these and other problems, and generally improve the quality, efficiency, and speed of data retrieval and storage using a data management ecosystem for cloud databases.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to a data management ecosystem for cloud databases. A data object (e.g., a record, a table, a schema, a database or data warehouse) may be provisioned in a cloud database platform such as a Snowflake or other data sharing platform. The data object may be related to records of a database stored on a database server in the cloud database platform. For example, an enterprise might generate records data through its operations, then store that data in the Snowflake platform. Using the Snowflake platform and/or similar cloud database platforms, that enterprise might not only store their own data in the cloud (which has its own benefits, particularly with respect to the use of virtual warehouses), but may also readily share the data with others (e.g., consumers of that data, such as other organizations). The data might be provided through a data marketplace, whereby users might exchange (e.g., sell) access to their data stored in the cloud database platform. The data management ecosystem may allow the creation and modification of query jobs through a version control process. Additionally and/or alternatively, the data management ecosystem may provide capabilities for provisioning access to the queries to execute successfully and aggregate result to the target state. Additional features may include job monitoring to provide status updates. The data management ecosystem for cloud databases may address features of data governance such as data quality check, data lineage, data validation, access provisioning and approvals of workflows related to deployment to a higher environment. The data management ecosystem may implement automatic catalog update to manage datasets between physical databases and data registries, and provide metadata recommendations for the derived data attributes. The data management ecosystem may detect personal or sensitive data for nonpublic personal information (NPI) or payment card information (PCI) data and enable data tokenization rules.

As one example of how aspects described herein may be implemented, a computing device may receive, from a user device, a request to migrate one or more data objects from a sandbox to a production environment of at least one of a plurality of data warehouses that may be provided as a service in a cloud computing environment. The computing resources may be dynamically allocated to the plurality of data warehouses. The computing device may determine a plurality of queries associated with the one or more data objects. The computing device may determine, based on the plurality of queries, lineage information indicating an origin and a sequence of events in a data chain that each of the one or more data objects may have passed through. The computing device may update a database catalog of the at least one of the plurality of data warehouses with the lineage information. The computing device may determine sensitive data contained within the one or more data objects. Based on a user selection, the computing device may generate tokenization for at least a portion of the determined sensitive data, and the tokenization may replace the portion of the determined sensitive data with a non-sensitive token. Based on the lineage information in the database catalog and the tokenization, the computing device may generate a migration plan for a migration path from the sandbox to the production environment of the at least one of the plurality of data warehouses. The computing device may validate the migration plan based on data control criteria in the production environment. After the validation, the computing device may cause the at least one of the plurality of data warehouses to execute the migration plan.

Aspects described herein may also relate to implementing a mechanism to manage sensitive data that may preserve the security and privacy. Prior to generating the tokenization for the sensitive data, the computing device may provide, to the user device, one or more options to tokenize the sensitive data. The computing device may scan the queries related to the one or more objects, and identify portions of data that may contain sensitive information. For example, the sensitive data may include payment card information (PCI), and/or nonpublic personal information (NPI). The computing device may present the potentially sensitive data to the user and then may select one or more portions for tokenization. The computing device may replace or mask the portions of sensitive data with non-sensitive substitutes based on the user selection of one or more options.

Aspects described herein also relate to provisioning objects and resources in a cloud database platform. Prior to receiving a request to migrate the one or more objects, the computing device may receive a request to provision the one or more data objects in the at least one of the plurality of data warehouses. The computing device may provision access to the one or more data objects in a production environment. The computing device may determine a plurality of dependent jobs to be executed prior to the execution of the migration plan. The computing device may cause the at least one of the plurality of data warehouses to execute the migration plan after the dependent jobs have been executed successfully. The computing device may add a sub-domain associated with a business organization to the data warehouses. The computing device may add a schema to the data warehouses and provision computing resources available to one or more servers that provide the data warehouses.

Aspects described herein also relate to implementation and execution of a migration plan. The computing device may validate the migration plan based on data quality check using metadata information associated with the objects to be migrated. The computing device may use a machine learning model (e.g., implemented on a neural network) to recommend an appropriate scheduling time to execute the migration plan. For example, the computing device may provide, as input to a trained machine learning model, the migration plan. The trained machine learning model may be trained to output recommended (e.g., available) scheduling times based on historical loads on the plurality of data warehouses and historical scheduling of fresh data load to source tables associated with the one or more data objects. The computing device may receive, from the trained machine learning model and based on the input, a recommendation on a scheduling time to execute the migration plan. For example, the computing device may determine a historical operating status of the plurality of data warehouses. Based on the historical operating status, the computing device may select a time period to execute the migration plan and cause at least one of the plurality of data warehouses to execute the migration plan during the time period. The historical operating status of the plurality of data warehouses may indicate a degree of utilization of each of the plurality of data warehouses.

These features, along with many others, are discussed in greater detail below.

BRIEF DESCRIPTION OF THE DRAWINGS

The present disclosure is described by way of example and not limited in the accompanying figures in which like reference numerals indicate similar elements and in which:

FIG. 6B shows a user interface for displaying a final migration plan in the data management ecosystem for cloud databases.

DETAILED DESCRIPTION

Figure 1:
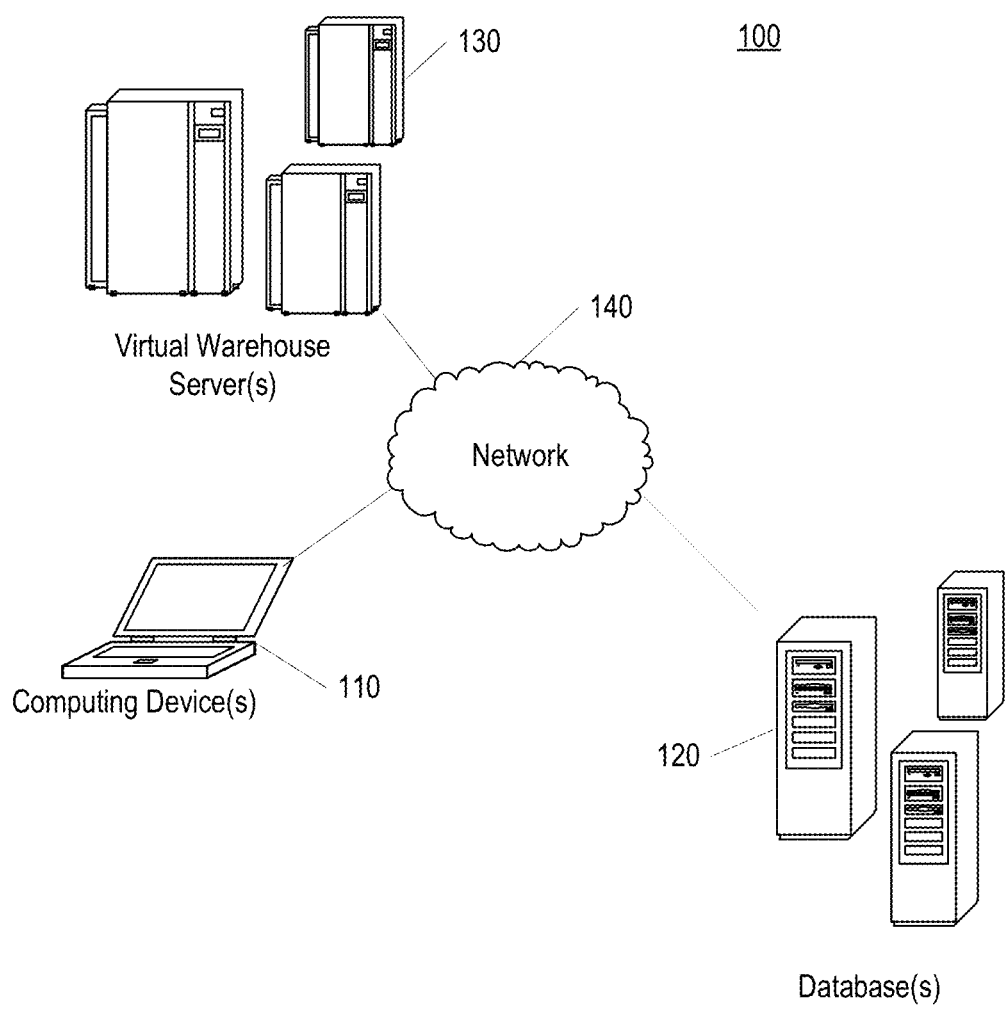
FIG. 1 shows an example of a system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for allowing data producers to share data with consumers in a data sharing marketplace, and in particular a manner in which shared data may be validated and migrated to a production environment. This functionality is effectuated by provisioning data objects such as tables, schemas and databases, gathering column level metadata for data attributes in the data cataloging process and providing recommendations on data classification on the data attributes. A computing device (e.g., a database server) may provide data scanning capabilities to identify sensitive data related to the data objects, and implement data masking and tokenization for the sensitive data. The computing device may define structured query language (SQL) based data processing pipelines and scheduling data processing jobs such as data migration to a production environment. The computing device may define controls for migrating the data objects to production and may scan the SQL queries to request appropriate data access prior to an execution of the migration plan. The computing device may use a machine learning model to determine an appropriate scheduling time for the execution of the migration. As a result, the computing device may migrate the data objects and the data processing pipeline to production at the scheduling time and monitor the migration process for failures.

Systems as described herein may include migrating one or more data objects from a sandbox to a production environment of at least one of a plurality of data warehouses that may be provided as a service in a cloud computing environment. The computing resources may be dynamically allocated to the plurality of data warehouses. A computing device may determine a plurality of queries associated with the data objects and lineage information indicating an origin and a sequence of events in a data chain that each of the objects has passed through. The computing device may update a database catalog with the lineage information. The computing device may determine sensitive data contained within the data objects and offer options to a user device from masking and tokenizing the sensitive data. Based on the lineage information and the tokenization, the computing device may generate a migration plan for a migration path from the sandbox to the production environment of the at least one of the plurality of data warehouses. The computing device may validate the migration plan based on data control criteria in the production environment. After the validation, the computing device may cause the at least one of the plurality of data warehouses to execute the migration plan.

The present disclosure is significantly different than conventional data processing and organization processes at least because it is fundamentally rooted in a warehouse-as-a-service cloud database platform. The present system is significantly more than the mere migration of data objects to a production environment: rather, the present system may analyze queries related to the data objects to determine lineage information and to provision access to the data objects prior to the migration process in pipeline fashion. The present system may determine historical operating status of the data warehouses to determine a time period to execute the migration plan. For example, the historical operating status may indicate a degree of utilization of each of the plurality of data warehouses.

The present disclosure is also fundamentally rooted in computing devices and, in particular, an environment with virtual warehouses. Presently, Snowflake's architecture is unique in that it allows for the cloud storage of data, with consumers of that data able to access the data through virtual warehouses. In contrast, other database systems rely on monolithic systems to handle all enterprise needs. It is precisely this architecture of Snowflake (and similar virtual warehouse systems) that is leveraged by the improvements discussed herein.

FIG. 1 shows a system 100. The system 100 may include one or more computing devices 110, one or more data warehouses 120, and/or one or more virtual warehouse servers 130 in communication via a network 140. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 2.

The computing devices 110 may, for example, provide queries to the virtual warehouse servers 130 and/or receive query results from the virtual warehouse servers 130, as described herein. The data warehouses 120 may store data and provide, in response to queries, all or portions of the stored data, as described herein. The data warehouses 120 may include, but are not limited to relational databases, hierarchical databases, distributed databases, in-memory databases, flat file databases, XML databases, NoSQL databases, graph databases, and/or a combination thereof. The virtual warehouse servers 130 may execute, manage, resize, and otherwise control one or more virtual warehouses, as described herein. Thus, for example, one or more of the computing devices 110 may send a request to execute a query to one or more of the virtual warehouse servers 130, and one or more virtual warehouses of the virtual warehouse servers 130 may perform steps which effectuate that query with respect to one or more of the data warehouses 120. The network 140 may include a local area network (LAN), a wide area network (WAN), a wireless telecommunications network, and/or any other communication network or combination thereof.

The virtual warehouse servers 130 and/or the data warehouses 120 may be all or portions of a cloud system. In this manner, the computing devices 110 may be located in a first location (e.g., the offices of a corporation), and the virtual warehouse servers 130 and/or the data warehouses 120 may be located in a variety of locations (e.g., distributed in a redundant manner across the globe). This may protect business resources: for example, if the Internet goes down in a first location, the distribution and redundancy of various devices may allow a business to continue operating despite the outage.

The virtual warehouse servers 130 may be all or portions of a virtual warehouse as a service system, such as is provided via the Snowflake architecture. For example, the computing devices 110 and/or the data warehouses 120 may be managed by an organization. In contrast, the virtual warehouse servers 130 may be managed by a different entity, such as Snowflake Inc. In this manner, a third party (e.g., Snowflake) may provide, as a service, virtual warehouses which may operate on behalf of organization-managed computing devices (e.g., the computing device 110) to perform queries with respect to organization-managed data warehouses (e.g., the data warehouses 120).

As used herein, a data warehouse, such as any one of the data warehouses 120, may be one or more databases or other devices which store data. For example, a data warehouse may be a single database, a collection of databases, or the like. A data warehouse may be structured and/or unstructured, such that, for example, a data warehouse may comprise a data lake. A data warehouse may store data in a variety of formats and in a variety of manners. For example, a data warehouse may comprise textual data in a table, image data as stored in various file system folders, and the like.

The data transferred to and from various computing devices in a system 100 may include secure and sensitive data, such as confidential documents, consumer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

Figure 2:
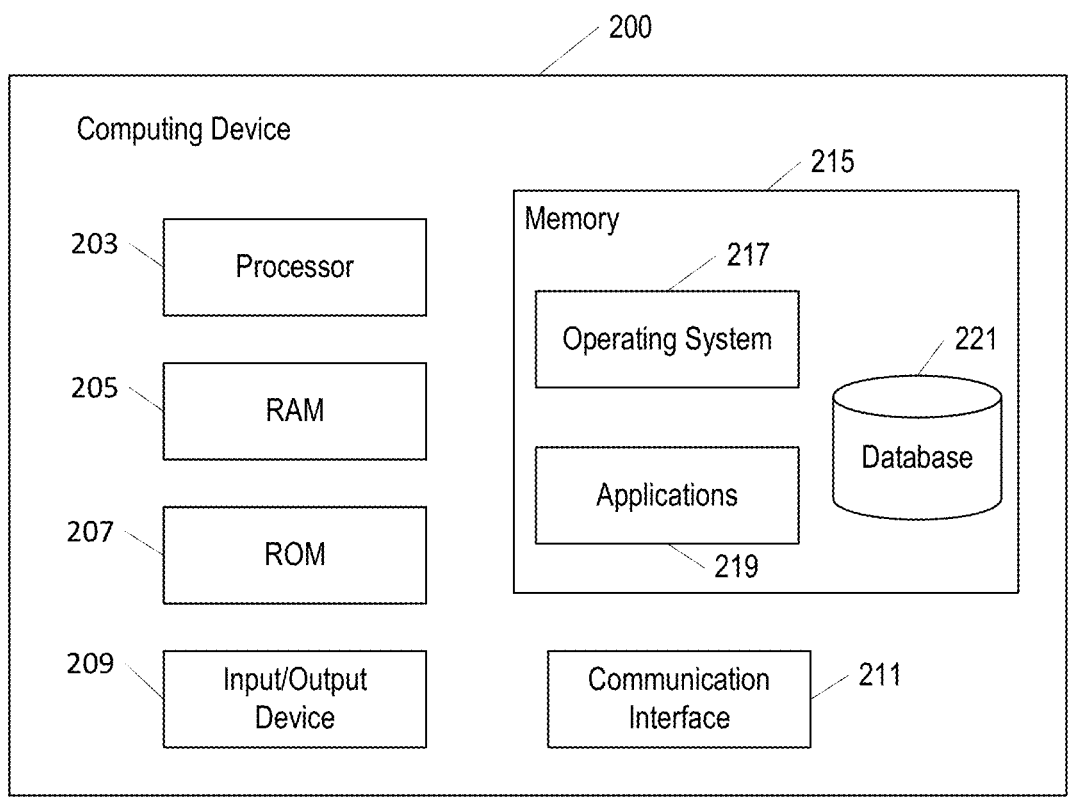
FIG. 2 shows an example computing device in accordance with one or more aspects described herein.

Turning now to FIG. 2, a computing device 200 that may be used with one or more of the computational systems is described. The computing device 200 may be the same or similar as any one of the computing devices 110, the virtual warehouse servers 130, and/or the data warehouses 120 of FIG. 1. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221.

For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Discussion will now turn to an example of how the computing devices of FIG. 1, such as the computing devices 110, the virtual warehouse servers 130, and the databases 120, may operate to fulfill a query by selecting one or more of a plurality of virtual warehouses.

Figure 3:
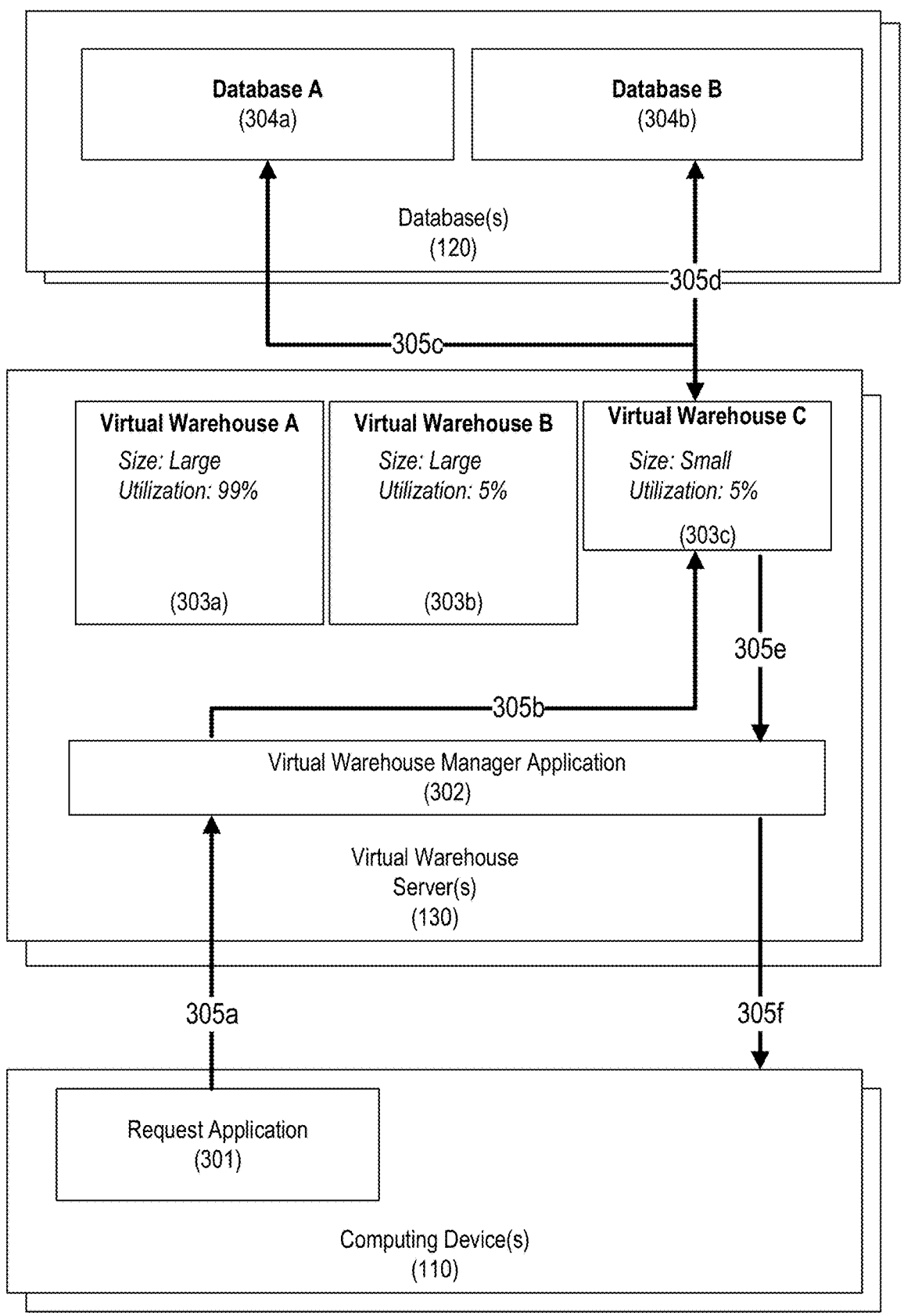
FIG. 3 depicts computing devices, virtual warehouse servers, and data warehouses working in conjunction to execute queries.

FIG. 3 shows a system comprising a data sharing platform (which comprises, e.g., the computing devices 110 of FIG. 1) and a cloud database platform (which comprises, e.g., the virtual warehouse servers 130 and the data warehouses 120 of FIG. 1). FIG. 3 may depict all or portions of a system configured according to the Snowflake architecture or a similar architecture, which provides access to cloud databases (in a database-as-a-service format) via which users may share via a data marketplace and/or may submit queries using one or more virtual warehouses. FIG. 3 also depicts various elements which may be portions of those computing devices, as well as transmissions between those devices. In particular, the computing devices 110 are shown having a request application 301, the virtual warehouse servers 130 are shown having a virtual warehouse manager application 302 and three virtual warehouses (a virtual warehouse A 303a, a virtual warehouse B 303b, and a virtual warehouse C 303c), and the data warehouses 120 are shown comprising a data warehouse A 304a and a data warehouse B 304b. All or portions of these devices may be part of the Snowflake architecture or another architecture. For example, the computing devices 110 may be users' personal computing devices, whereas the virtual warehouse servers 130 may be cloud servers managed by Snowflake Inc., of San Mateo, CA.

The data sharing platform 307 and cloud database platform 306 are shown as separate in FIG. 3. In some instances, the data sharing platform 307 and the cloud database platform 306 (and/or any portions thereof) may be managed by the same or different entities. For example, the cloud database platform 306 may correspond to preexisting Snowflake architecture managed by Snowflake Inc. of San Mateo, CA, whereas the data sharing platform 307 may be managed by another organization. In practice, some of the computing devices, networks, and other aspects of the data sharing platform 307 and/or the cloud database platform 306 may overlap. For instance, some of the devices managed by one entity might be located in offices managed by Snowflake, and/or the devices in the data sharing platform 307 may be communicatively coupled to devices in the cloud database platform 306 via a private network.

As part of step 305a, the request application 301 may transmit, to the virtual warehouse manager application 302, a request for a query. The transmitted request may be in a variety of formats which indicate a request for a query to be executed. For example, the request may comprise a structured query which may be directly executed on one or more of the data warehouses 120 (such as an SQL query), and/or may comprise a vaguer request for data (e.g., a natural language query, such as a request for "all data in the last month").

The request application 301 may be any type of application which may transmit a request to the virtual warehouse manager application 302, such as a web browser (e.g., showing a web page associated with the virtual warehouse manager application 302), a special-purpose query application (e.g., as part of a secure banking application, such as may execute on a tablet or smartphone), an e-mail application (e.g., such that the request to the virtual warehouse manager application 302 may be transmitted via e-mail), or the like. As such, the request may be input by a user in a user interface of the request application 301 and using, for example, a keyboard, a mouse, voice commands, a touchscreen, and/or the like.

As part of step 305b, the virtual warehouse manager application 302 may select one of a plurality of available virtual warehouses (in this case, the virtual warehouse C 303C) to execute the query. As part of this process, the virtual warehouse manager application may determine which of a plurality of virtual warehouses should address the request received in step 305. The virtual warehouse manager application 302 may identify an execution plan for the query by determining one or more sub-queries to be executed with respect to one or more of the data warehouses 120. For example, the request may comprise querying both the data warehouse A 304a and the data warehouse B 304b for different portions of data. The virtual warehouse manager application 302 may, based on the query and the execution plan, predict a processing complexity of the query. The processing complexity of the query may correspond to a time to complete the query (e.g., the time required to perform all steps of the execution plan), a quantity of computing resources (e.g., processor time, memory) required to execute the query, or the like. The virtual warehouse manager application 302 may additionally and/or alternatively determine an operating status of the plurality of virtual warehouses and/or processing capabilities of the plurality of virtual warehouses. For example, the virtual warehouse A 303a is shown as being large (e.g., having relatively significant processing capabilities) but having a utilization of 99% (that is, being quite busy), the virtual warehouse B 303b is shown as being large and having a utilization of 5% (that is, being quite free), and the virtual warehouse C 303c is shown as being small and having a utilization of 5%. Based on the processing complexity, the operating status of the plurality of virtual warehouses, and/or the processing capabilities of the plurality of virtual warehouses, a subset of the plurality of virtual warehouses may be selected. For example, that subset may comprise both the virtual warehouse B 303b and the virtual warehouse C 303c, at least because both have a low utilization rate and thus may be capable of handling the request received from the request application 301. From that subset, one or more virtual warehouses may be selected to execute the query. For example, as shown in the example provided in FIG. 3, the virtual warehouse C 303c has been selected to address the query. This may be because, for example, the query may be small (that is, the execution plan may be simple or otherwise quick to handle), such that executing the query on the virtual warehouse C 303c may be cheaper and may free up the virtual warehouse B 303b for handling larger, more complex queries.

Virtual warehouses, such as the virtual warehouse A 303a, the virtual warehouse B 303b, and/or the virtual warehouse C 303c, may comprise a respective set of computing resources. For example, each virtual warehouse may execute on one or a plurality of servers (e.g., the virtual warehouse servers 130), and each virtual warehouse may be apportioned a particular quantity of computing resources (e.g., computing processor speed, memory, storage space, bandwidth, or the like). Broadly, such quantities of computing resources may be referred to via "t-shirt sizes," such that one virtual warehouses may be referred to as "large," whereas another may be referred to as "small." Virtual warehouses may be resized such that, for example, the virtual warehouse A 303a (which is large) may be shrunk down to a smaller size to save money and/or to allocate resources to another virtual warehouse. Virtual warehouses may also have different utilization rates. For example, a virtual warehouse using substantially all of its resources to execute a query may be said to be fully occupied (that is, to have a utilization rate of approximately 100%), whereas a virtual warehouse not performing any tasks may be said to be free (that is, to have a utilization rate of approximately 0%). The size of the virtual warehouses may affect the utilization rate: for example, a larger virtual warehouse may be capable of handling more queries at the same time as compared to a relatively smaller virtual warehouse. Moreover, as indicated by the various steps described with respect to FIG. 3, virtual warehouses may be configured to execute one or more queries with respect to at least a portion of the data warehouses 120, collect results from the one or more queries, and provide, to one or more computing devices, access to the collected results. As such, the size and/or utilization of a particular virtual warehouse may impact its ability to enable execution of queries, collect results, and provide those results.

Virtual warehouses may use one or more view definitions to retrieve content from the databases 120. For example, a virtual warehouse might use a view definition to specify which portion(s) of data stored in the databases 120 should be displayed to a user. Such view definitions might be established such that, for example, a consumer of data might not have access to all data stored by a database, but rather might be limited to a portion of that data.

Though the virtual warehouse manager application 302 is shown as part of the virtual warehouse servers 130, the virtual warehouse manager application 302 may execute on a wide variety of computing devices. For example, the virtual warehouse manager application may execute on one or more of the computing devices 110, such as the same computing device 110 hosting the request application 301. As another example, the virtual warehouse manager application may execute on an entirely separate computing device. Because the virtual warehouse manager application 302 may perform steps above and beyond conventional virtual warehouse functionality, the application may execute on an entirely separate computing device and may interface with preexisting virtual warehouse systems, e.g., Snowflake.

As part of step 305c and 305d, the selected virtual warehouse (in this case, the virtual warehouse C 303c) may execute the query requested by the request application 301. As shown in FIG. 3, this entails querying both the data warehouse A 304a and the data warehouse B 304b. The data warehouses 120, such as the data warehouse A 304a and the data warehouse B 304b, need not be the same: for example, the data warehouse A 304a may have an entirely different format, may have entirely different schedules which affect their size at any given time, and may have an entirely different structure as compared to the data warehouse B 304b. For instance, the data warehouse A 304a may comprise a SQL database, whereas the data warehouse B 304b may comprise a file server which stores files according to the File Allocation Table (FAT) file system. As part of this process, the virtual warehouse C 303c may receive, store, and/or organize results from the data warehouses 120. For example, the virtual warehouse C 303c may receive query results from the data warehouse A 304a and the data warehouse B 304b, may store those results in memory, and then may encrypt those results for security purposes.

As part of step 305e, the virtual warehouse C 303c provides the collected results to the virtual warehouse manager application 302. Then, as part of step 305f, the virtual warehouse manager application 302 provides the results to one or more of the computing devices 110. This process is optional, as the virtual warehouse C 303c may, in some instances, provide the results directly to one or more of the computing devices 110. Moreover, the results need not be provided back to the request application 301: for example, the results may be provided to an entirely different computing device (e.g., such that the request may have been received from a smartphone but the results may be delivered to an associated laptop) and/or may be provided to an entirely different application (e.g., such that the request may have been received via the request application 301, but the results may be received by a separate application, such as a spreadsheet application, executing on one or more of the computing devices 110).

The steps depicted in FIG. 3 are illustrative, and represent simplified examples of processes which may be performed by the elements depicted in FIG. 3. For example, while step 305a is reflected as an arrow directly leading from the request application 301 to one or more of the virtual warehouse servers 130, the request may in fact be routed through various other computing devices as part of the network 140. As another example, the query process reflected in step 305c and step 305d may involve a plurality of different transmissions between the virtual warehouse C 303c and the data warehouses 120.

Figure 4:
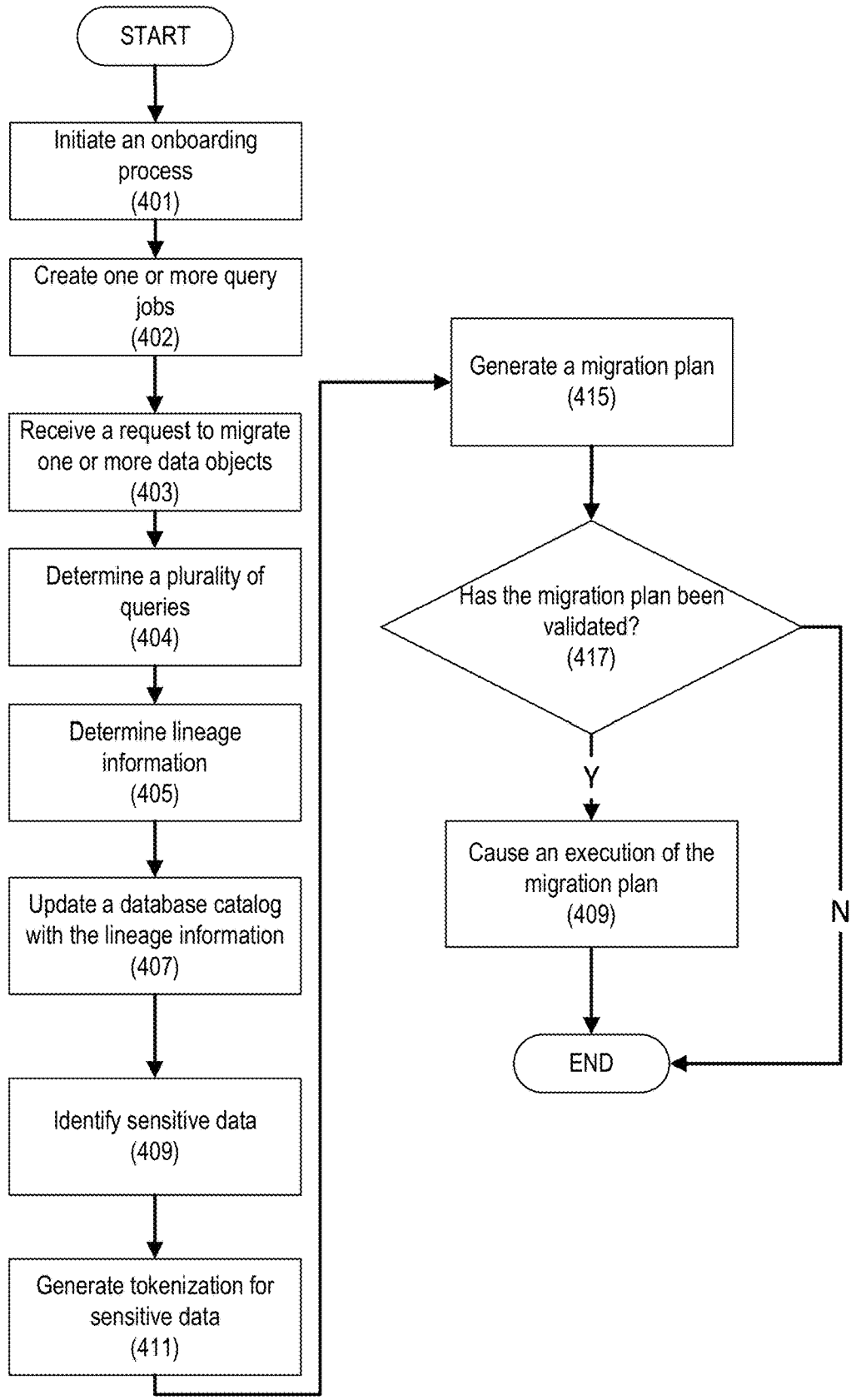
FIG. 4 shows a flow chart which may be performed to implement a data management ecosystem for cloud databases.

As a preliminary introduction to FIG. 4, in the circumstance where a job creation process may be invoked and data objects may be migrated from a sandbox to a production environment. Data scientists may invoke a job creation process prior to the migration of the data objects. The data scientists may tend to work in their local environment such as a sandbox. They may run various queries and test the data objects in the sandbox. When the data objects are promoted to a higher environment, such as a production environment, unexpected issues may arise which may cause disruptions to the production environment. For example, the migration may need access to ten different data objects and three of the objects might not have the proper access provisioning. A new job may be created or an existing job may be edited. The job creation process may be related to automated actions or user performed actions. The user-performed actions may define the job configuration based on the queries related to the data objects, define a job execution schedule, and/or submit a job creation request. The automated actions may perform a scan on the queries to identify objects used, validate access for objects if needed, populate table metadata, add metadata to database catalog, provide suggestions on data tokenization, and/or capture data lineage information. As such, the data management ecosystem may build a pipeline of automated jobs that may submit the access requests, navigate through the approval processes, configure relevant parameters, and proactively scan the queries to identify and handle potential issues on behalf of the data scientists prior to the migration. The data management ecosystem may implement a heightened data governance process via data quality checks, lineage tracking, data validation, accessing provisioning and approval of workflows in data migration. The data management ecosystem may implement a heightened data security and privacy mechanism by scanning the queries and identifying sensitive data in data objects, so that options may be provided to users for masking and tokenizing the sensitive data.

FIG. 4 depicts a flowchart with steps which may be performed by a computing device, such as one or more of the computing devices 110, the virtual warehouse servers 130, and/or the data warehouses 120. One or more non-transitory computer-readable media may store instructions that, when executed by one or more processors of a computing device, cause performance of one or more of the steps of FIG. 4. The steps depicted in FIG. 4 may operate on a Snowflake environment or other virtual warehouse environment, such that they may be performed by a computing device within or external to such an environment. For example, the steps depicted in FIG. 4 may be performed on a user device external to the cloud database platform.

At step 401, the computing device may initiate an onboarding process for one or more data objects. The data objects may include, for example, a table, a schema, a database, and/or a data warehouse. The data objects may correspond to one or more records stored by the databases. Prior to receiving the request to migrate, the computing device may receive a request to provision the one or more data objects in the at least one of the plurality of data warehouses. Based on the configuration set up in the onboarding process, the computing device may identify access information, such as permissions and privileges that the user device may need in the data migration process. The computing device may provision access to the one or more data objects in the production environment and accordingly grant the access to the user device.

The computing device may implement the onboarding process such that a data administrator and/or a data scientist in an organization may set up the new schemas, databases, and data warehouses in the data management ecosystem. For example, the computing device may add a sub-domain associated with a business organization to the at least one of the plurality of data warehouses. The computing device may add a schema to the at least one of the plurality of data warehouses, and/or provision a plurality of computing resources available to one or more servers that may provide the at least one of the plurality of data warehouses. The data administrator may also define governance rules for data control and management within the organization. For example, the computing device may provide a user interface for the data scientist to enter configuration information, such as, to add a business organization as a new sub-domain, select the databases associated with each line of business (LOB) in the business organization, select or add schemas to the databases, select or add resources provisioned for the databases, and submit a provisioning request for one or more data objects. The computing device may generate and configure the schemas, databases and data warehouses based on the configuration information. The computing device may determine whether new access might be needed, request and grant access accordingly. For example, the computing device may provision Snowflake roles. The roles may be the entities to which privileges on the data objects may be granted and revoked. The computing device may assign the Snowflake roles to users to allow them to perform actions needed for business functions in their organization. A user might be assigned multiple roles, which may allow the user to switch roles to perform different actions using separate sets of privileges.

Figure 5A:
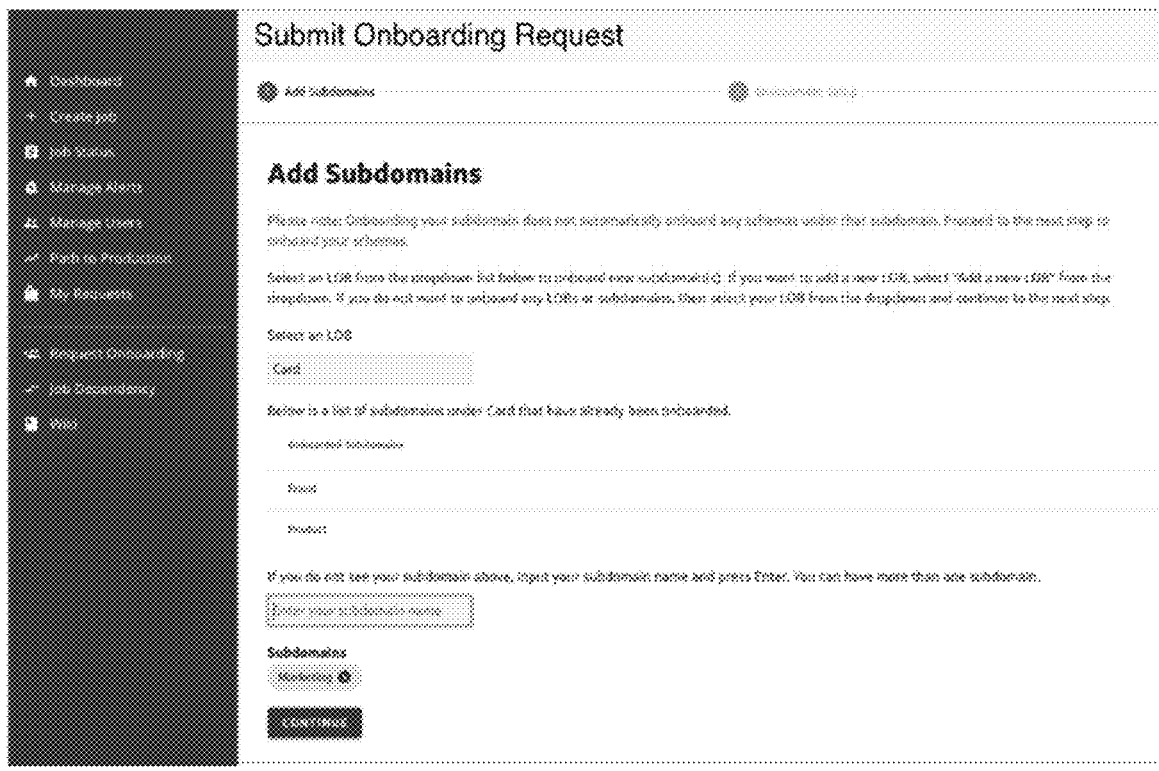
FIG. 5A is an illustrative user interface for an onboarding process in the data management ecosystem for cloud databases.
Figure 5B:
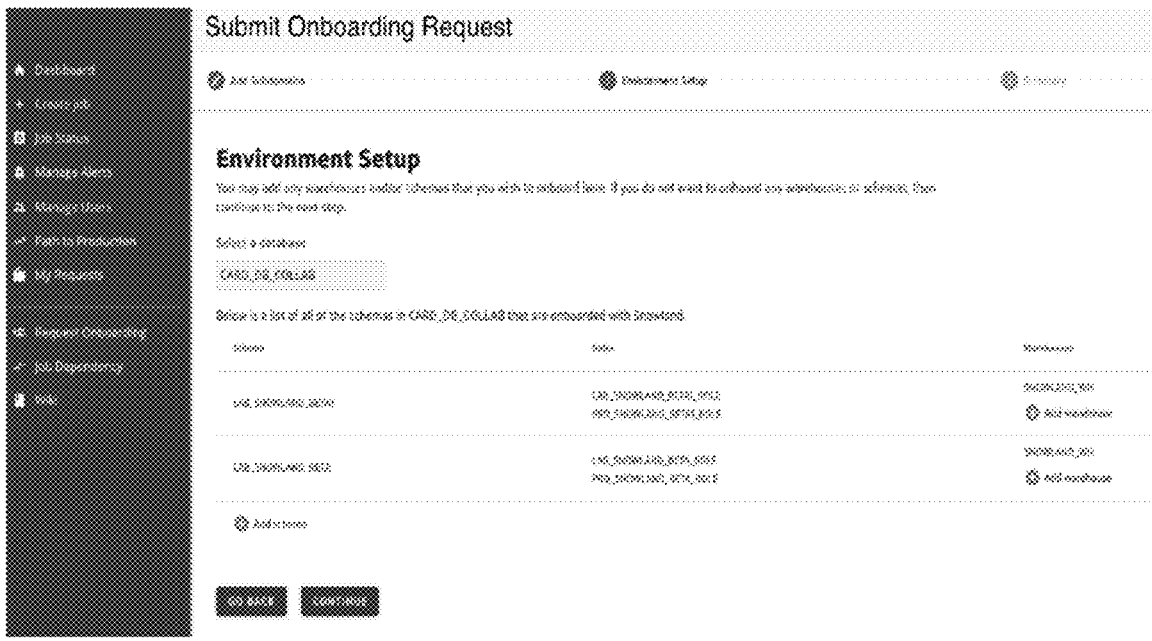
FIG. 5B is another illustrative user interface for an onboarding process in the data management ecosystem for cloud databases.

FIGS. 5A-5B are illustrative user interfaces for an onboarding process in the data management ecosystem for cloud databases. As illustrated in FIG. 5A, as part of the onboarding process, a data scientist may be prompted to select a LOB from a dropdown list or add a new LOB. For example, the data scientist may select the LOB "Card" corresponding to the credit card unit in an institution. In response to the selection of the LOB "Card," the interface may display a list of subdomains under the LOB "Card," such as "Fraud" and "Product" subdomains. The data scientist may select an existing subdomain or choose to input a new subdomain. For example, the data scientist may enter a new subdomain name "Marketing."

In FIG. 5B, the interface may prompt the data scientist to enter information for the environment setup, such as, to add any data warehouses or schemas. For example, the data scientist may select a database "CARD_DB_COLLAB" and a schema "LAB_SNOWLAND_BETA1" from the list of database schemas. One or more roles may be provisioned for the underlying data objects. For example, the role "LAB_SNOWLAND_BETA_ROLE" existing in the schema "LAB_SNOWLAND_BETA" is provisioned access to leverage the warehouses, databases and underlying schemas to execute user developed queries. Accordingly, the interface may display a summary (not shown in FIGS. 5A-5B) of the configuration information such as the LOB, the subdomain, the database name, the schema name, and the data warehouse name.

At step 402, the computing device may create one or more query jobs associated with the one or more data objects. The computing device may create a new scheduled or one-time process that may run on the data objects. For example, the data scientist may provide job creation information for the new job such as a name of the job, the LOB, the subdomain, the database, the schema, the Snowflake warehouse, load patterning, etc. The computing device may review the data objects referenced in the job creation information. For example, the computing device may review a table in a production environment and determine whether it is properly provisioned during the onboarding process. The computing device may also check the user role access to the table and request access if needed.

At step 403, the computing device may receive, from a user device, a request to migrate the one or more data objects from a sandbox to a production environment of at least one of a plurality of data warehouses and the plurality of data warehouses may be provided as a service in a cloud computing environment. The computing resources may be dynamically allocated to the plurality of data warehouses. For example, the user device may be similar to the computing devices 110 and may send a request to migrate data objects stored in the cloud database platform.

At step 404, in response to receiving the request from the first user device, the computing device may determine a plurality of queries associated with the one or more data objects. The queries may be executed against the databases using processing resources of one or more virtual warehouses provided by the cloud database platform. The data warehouses may store data and provide, in response to the queries, all or portion of the stored data, including the one or more data objects.

At step 405, the computing device may determine, based on the plurality of the queries, lineage information indicating an origin and a sequence of events in a data chain that each of the one or more data objects may have passed through. The computing device may collect results from the one or more queries, and analyze the queries to extract the lineage information related to the data objects. For example, the computing device may determine that a data object (e.g., an attribute) in a table A may be sourced from an upstream table B. As a new enterprise user arrives into the data management ecosystem, the lineage information may facilitate the new user to track the origin of the data object, the frequency it may have been accessed, how data sets may be built and aggregated, the sequence of events in the data chain that the data object has passed through and any transformation along the data journey. The data lineage information may indicate a full context of the data object to facilitate business or technical decisions using accurate, complete and trustworthy data. The data lineage information may provide insights to the shared data to facilitate tasks related to, such as credit decisioning process and fraud detection logics. For example, a user device may be a server in a financial institution that processes loan and/or credit applications. Based on the data lineage information indicating the related transaction records originating from a trustworthy source or non-trustworthy, the user device may approve or deny the applications.

At step 407, the computing device may update a database catalog (e.g., a database catalog of the at least one of the plurality of data warehouses) with the lineage information. For example, the database catalog may offer a visual representation of the data lineage and data flows illustrating the processes and transformations along the way. With database lineage and data catalog information, enterprise users may understand the origins of data objects, who may have used them, how they may be used, and how they may have changed over the lifecycle. The computing device may update the database catalog automatically to reflect any changes in the lineage information.

The computing device may implement an automated job to capture the lineage information, pull or push the information to the database catalog and register the relevant data in the database catalog. The database catalog may serve as a central repository for the data scientists within the organization to use and provide insights to facilitate decisions.

At step 409, the computing device may determine sensitive data contained within the one or more data objects. The sensitive data may include personal data such as cardholder data (CHD), according to the Payment Card Industry Data Security Standard (PCI DSS). The sensitive data may additionally or alternatively include payment card information (PCI) and other payment data. The personal data may include what the European Union's General Data Protection Regulation (GDPR) considers personal data such as personally identifiable information (PII), nonpublic personal information (NPI), and/or personal health information (PHI). The sensitive data may also include financial data or confidential data. For example, the sensitive data may be related to a transaction record containing sensitive financial data. The sensitive data may be related to comments or feedback of a service provided by an institution or other service providers that may be potentially embarrassing to be divulged to a third-party. The sensitive data may include Human Resource related information such as performance review that may be sensitive or confidential.

The computing device may scan the queries and the data objects in the sandbox. For example, the computing device may scan the libraries and identify certain patterns that may correspond to sensitive data. The computing device may scan the values in the data records to identify numeric patterns that may be formatted as social security numbers or credit card numbers. The computing device may scan the names of the columns of the data records to identify key words representing bank account identifiers or driver license numbers. The computing device may scan the data lineage information in the database catalog to identify certain data objects such as some data records or tables. The computing device may retrieve data lineage information, such as the origins of the data objects (e.g., a transaction table), who may have used them (e.g., administrators from a credit card unit of an organization), how they may be used (e.g., to facilitate fraud detection). Based on the lineage information, the computing device may identify that certain columns of the transaction table may contain sensitive information such as the bank account identifiers. The computing device may scan metadata to identify, for example, a table may be related to patients' health data.

At step 411, the computing device may generate, based on a user selection, tokenization for at least a portion of the determined sensitive data and the tokenization may replace the portion of the determined sensitive data with a non-sensitive token. The token may be a reference (e.g., an identifier) that may map back to the sensitive data and the mapping from the original sensitive data to a token may use methods that render tokens infeasible to reverse in the absence of the tokenization system. Tokenization may be a non-mathematical approach that replaces sensitive data with non-sensitive substitutes without altering the type or length of data. For example, the computer device may determine that a data object may be related to sensitive data such as a social security number, or a transaction record may include sensitive data elements such as a bank account identifier. The tokens may be created, for example, from random numbers. Prior to generating the tokenization, the computing device may provide, to the user device, one or more options to tokenize the determined sensitive data. For example, the computing device may provide options to the data scientist or owner of the sensitive data to mask or tokenize the sensitive data containing six sensitive data elements, including a bank account, a social security number, a driver's license number, and/or a passport number. The user may select the potential sensitive data elements for tokenization. For example, the user may select an option to tokenize the bank account and the tokenization may replace a sensitive data element (e.g., the bank account) with a non-substitute (e.g., the token). The token may be a unique identifier that may retain the pertinent information about the bank account without compromising its security and privacy. The computing device may store a mapping between the token and sensitive data element in a database. As such, the sensitive data may be masked before it may be migrated to the production environment and potentially may be exposed to a greater user community.

At step 413, the computing device may generate, based on the lineage information in the database catalog and the tokenization, a migration plan for a migration path from the sandbox to the production environment of the at least one of the plurality of data warehouses. The computing device may compile the information from a user's migration request and lineage and tokenization information collected from steps 401-411 to generate an initial migration plan. The computing device may create a job migration task which may include one or more jobs to implement the initial migration plan. The initial migration plan may include information such as the LOB, the subdomain, the database, the schema, the data warehouse, an indication whether the sensitive data is tokenized, the relevant processing jobs, the migration activation time, expiration time, an approver identifier for the migration plan, business justification for the migration and the like.

Figure 6A:
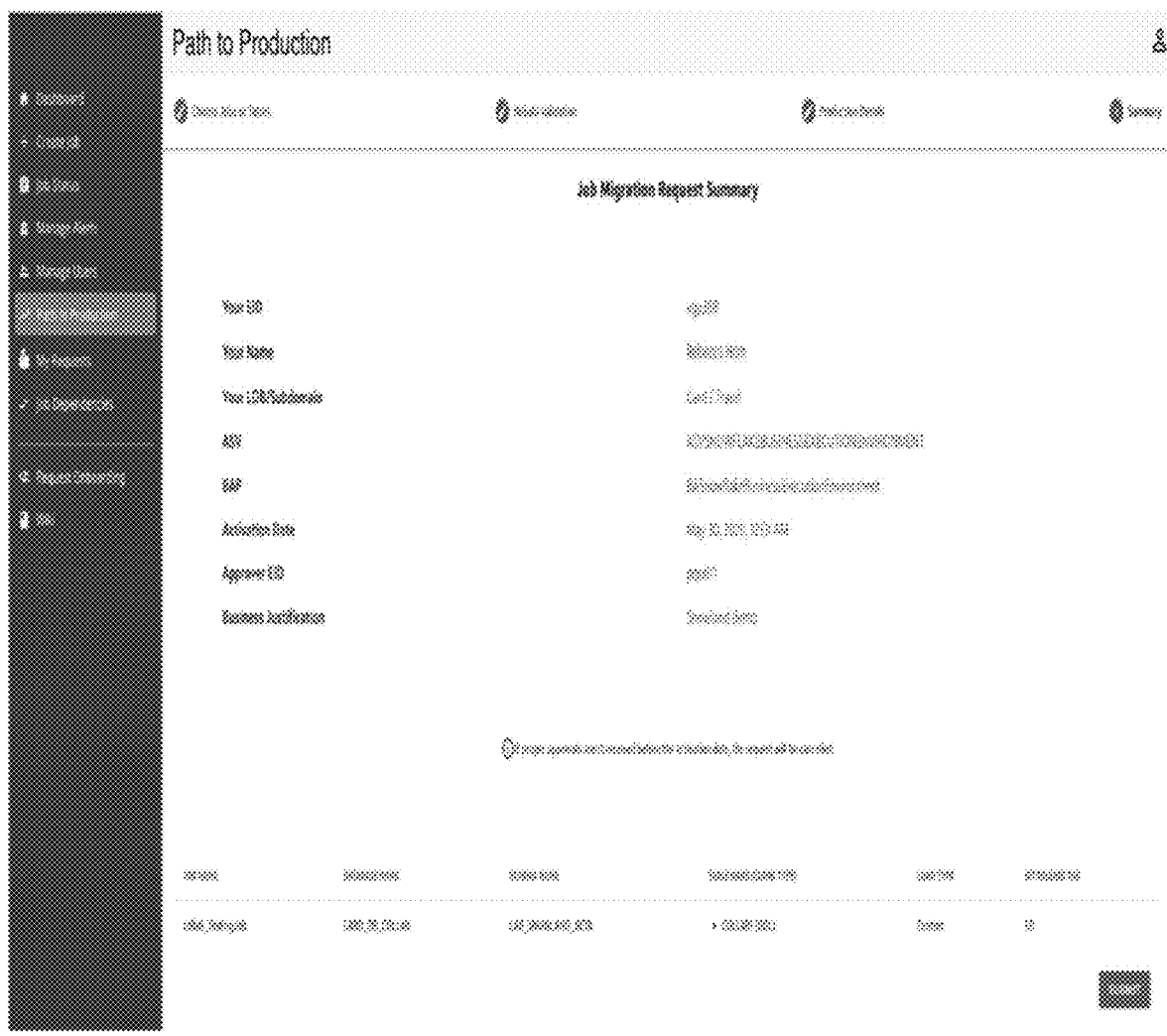
FIG. 6A shows a user interface for displaying an initial migration plan in the data management ecosystem for cloud databases.

FIG. 6A is an illustrative user interface for generating an initial migration plan. The interface may display a summary of the job migration request including information such as the requestor's identifier, the name of the requestor, the LOB and subdomain information which is displayed as "Card/Fraud," the execution environment, the approver's identifier and the business justification. In the lower portion of the interface, a job "collab_testingjob" is created to implement the migration plan, together with the related data objects, such as the database name, the schema name, the table name and a tag indicating a version of the migration plan. The initial migration plan (e.g., version 1.0) may be subjected to further validation and modification at step 415.

At step 415, the computing device may determine whether the initial migration plan has been validated based on data control criteria in the production environment. The computing device may validate the initial migration plan based on data quality check using metadata information. The computing device may execute the queries in the sandbox to obtain the historical metadata on a data attribute, such as a mean or average value and a range. The computing device may validate the data objects to be migrated based on this historical metadata information. For example, a data object may be related to a transaction record comprising a transaction amount and a Merchant Category Code (MCC). The metadata may indicate the type of the attributes and a length of the attribute. For example, the transaction amount may be a value and the MCC may be a four-digit number representing a merchant in retail services. The computing device may provide a recommended range for the transaction amount based on historical transaction records. The computing device may provide predefined rules or formats for the MCC based on international organization for standardization (ISO) 18245 concerning the assignment of MCC in retail services. If the data object does not conform to the recommended range or format, the computing device may provide an option to the data scientist to either reject, modify, and/or accept the data object for migration.

Additionally or alternatively, the computing device may validate the initial migration plan based on dependent jobs. For example, the computing device may determine a plurality of dependent jobs that need to be executed prior to the execution of the initial migration plan. The computing device may verify that the migration plan would be executed only after the dependent jobs have been executed successfully. For example, in a code validation process, the computing device may build one or more processing jobs on behalf of the data scientist. A processing job may be configured such that its execution would depend on one or more dependent jobs to be executed successfully. This code validation process may prevent bad code from being promoted to a production environment. The code validation process may be integrated with the change control, approval process, and access provisioning. For example, the computing device may scan the SQL codes and identify the tables the migration plan may attempt to access, and generate a report. The computing device may determine the job executing the migration plan may need to access, for example, 40 tables, and may send the access request automatically. As such, the access flow and approval process may be automated.

Additionally or alternative, the computing device may valid a scheduling time for the execution of the migration plan. The initial scheduling time may be submitted by the data scientist. The computing device may provide a recommended scheduling time based on historical operating status, such as a degree of utilization of each of the plurality of data warehouses. For example, the computing device may determine the historical operating status of the plurality of data warehouses. The computing device may select, based on the historical operating status, a time period to execute the migration plan. The computing device may select a time period such that the migration plan would minimize the disruption to the operation of the data warehouses. The computing device may select a time period such that the data warehouses may have a low degree of utilization during the time period.

The computing device may provide a recommended scheduling time using a machine learning model, such as may be implemented via the deep neural network 700 of FIG. 7 (discussed below). For example, the computing device may train a machine learning model to recommend an appropriate scheduling time. The machine learning model may be trained based on historical loads on the plurality of data warehouses. For example, the historical loads may indicate an operating status, such as a degree of utilization of each of the plurality of data warehouses. Additionally or alternatively, the machine learning model may be trained based on historical scheduling of fresh data load to source tables associated with the one or more data objects. For example, such fresh data load may increase loads on the relevant databases or the relevant data objects might not be updated concurrently, such that the computing device may refrain from executing the migration plan during the fresh data load period. The computing device may provide, as input to a trained machine learning model, the migration plan. The computing device may receive, from the trained machine learning model and based on the input, a recommendation on a scheduling time to execute the migration plan. The data scientist may choose a scheduling time or window for the execution of the migration plan.

If at step 415, the computing device determines that the initial migration plan has not been validated, the process may terminate. If at step 415, the computing device determines that the initial migration plan has been validated the process may proceed to step 417.

At step 417, after the validation, the computing device may generate a final migration plan. The computing device may cause the at least one of the plurality of data warehouses to execute the final migration plan. Once the migration plan is finalized, the computing device may freeze the codes and the relevant data objects in the sandbox and prepare to deploy them to the production environment.

Conventional systems may use different tools to perform various tasks to conduct data quality checks and/or data lineage checks. The data management ecosystem described herein may implement a set of services and a pipeline to support functionalities in data quality check, data lineage, code validation, access provisioning, and workflow deployment. The data management ecosystem may also perform automatic catalog updates, metadata recommendation and intelligent data detection on sensitive data.

Figure 6B:
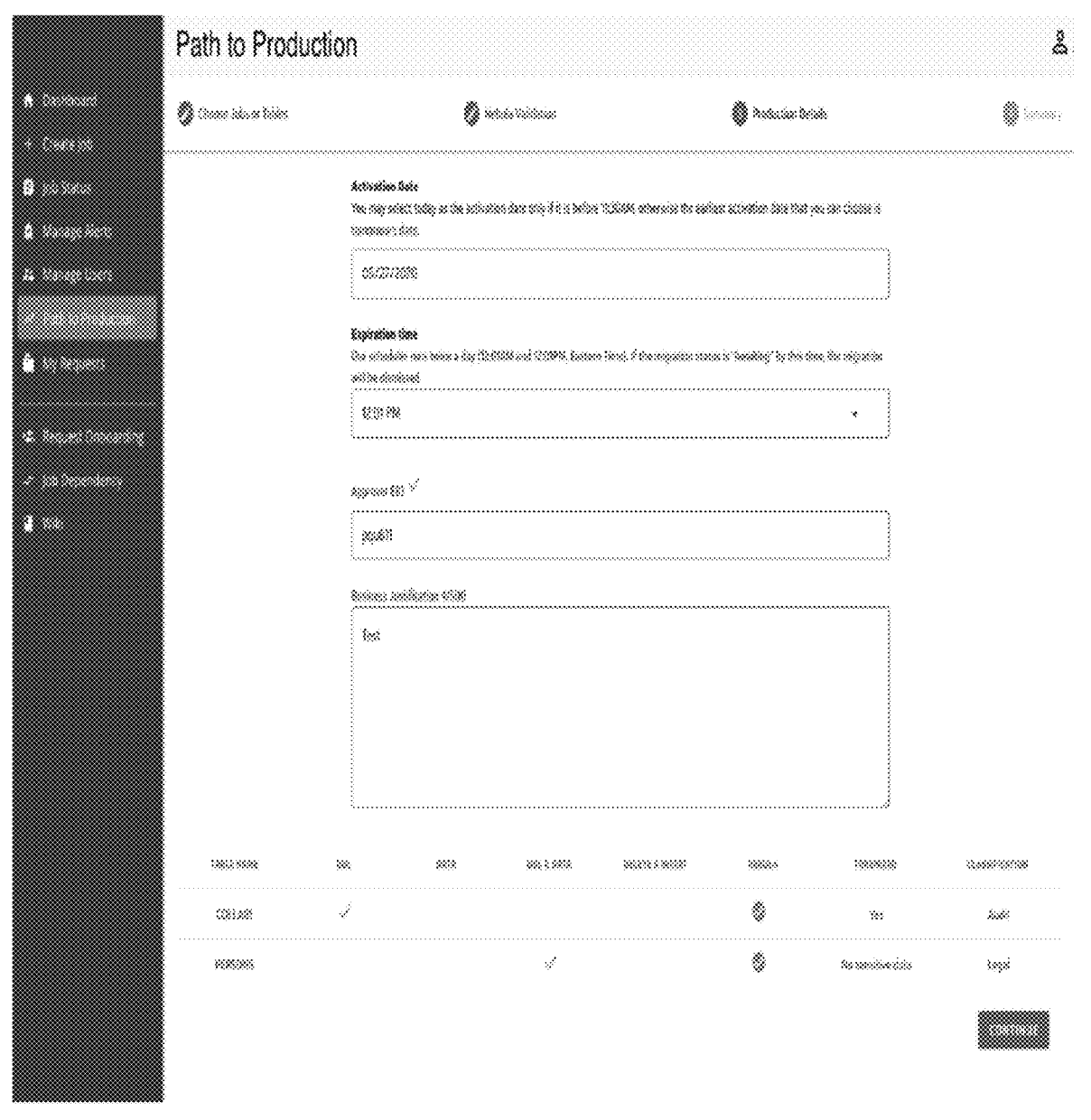

FIG. 6B shows a user interface indicating a final migration plan. As illustrated in FIG. 6B, the computing device may present an activation date for the migration plan. The activation date may correspond to the recommended scheduling time. The computing device may present several options of recommended scheduling times to execute the migration plan. For example, the interface may display to the data scientist "you may select as the activation date only if it is before 11:30 AM, otherwise the earliest activation data you can choose is tomorrow's date." The computing device may display an expiration time for the migration plan, indicating "our schedule runs twice a day (12:01 AM and 12:01 PM, Eastern Time). If the migration status is 'Awaiting' by this time, the migration will be dismissed." The interface may also display the approver's ID and business justification for the migration. In the lower portion of the interface, the table names (e.g., the data objects) related to the migration may be displayed. As shown in FIG. 6B, the migration plan involves data structure change via data definition language to the first table "COLLAB1" and both data structure and underlying data changes to the second table "PERSONS." Both tables have passed the data validation process as indicated by the green check marks. The interface also displays that the first table contains tokenized sensitive data and the second table does not contain any sensitive data.

Figure 7:
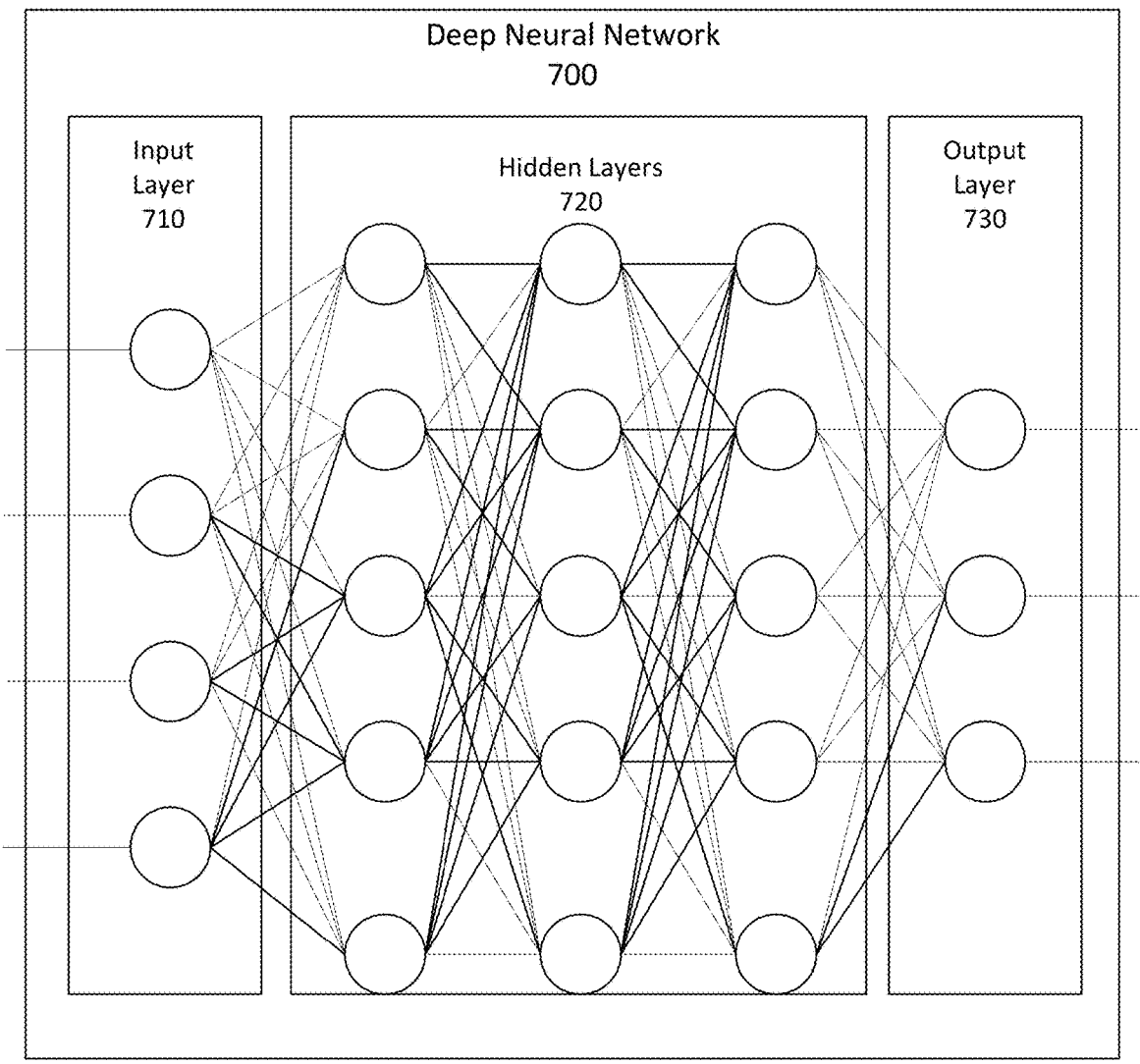
FIG. 7 depicts an exemplary deep neural network architecture for a model according to one or more aspects of the disclosure.

FIG. 7 depicts an exemplary deep neural network architecture 700. This architecture is one example of how a machine learning model might be implemented in order to, for example, recommend a scheduling time in accordance with step 415 of FIG. 4. The architecture depicted in FIG. 7 need not be performed on a single computing device, and may be performed by, e.g., a plurality of computers (e.g., any one of the devices depicted in FIG. 1). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 710, one or more hidden layers 720, and an output layer 730. A deep neural network, as used herein, may be an artificial network that has more than one hidden layer. Illustrated deep neural network architecture 700 is depicted with three hidden layers, and thus may be considered a deep neural network. The number of hidden layers employed in the deep neural network architecture 700 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computing device comprising:
   one or more processors; and
   memory storing instructions that, when executed by the one or more processors, cause the computing device to:
   receive, from a user device, a request to migrate one or more data objects from a sandbox to a production environment of at least one of a plurality of data warehouses that are provided as a service in a cloud computing environment, wherein computing resources are dynamically allocated to the plurality of data warehouses;
   scan a plurality of queries in the sandbox to determine the one or more data objects to be migrated to the production environment;
   provision access to the one or more the data objects in the production environment;
   determine, based on the plurality of queries, lineage information for each of the one or more data objects, wherein the lineage information comprises an origin of each of the one or more data objects, and a frequency with which each of the one or more data objects has been accessed;

prior to an execution of a migration plan, update a database catalog of the at least one of the plurality of data warehouses with the lineage information;

identify sensitive data contained within the one or more data objects;

generate a tokenization for at least a portion of the sensitive data, wherein the tokenization replaces the portion of the sensitive data with a non-sensitive token without altering a type or length of the portion of the sensitive data;

generate, based on the lineage information in the database catalog and the tokenization, the migration plan for a migration path from the sandbox to the production environment of the at least one of the plurality of data warehouses;

validate the migration plan based on data control criteria in the production environment;

provide, as input to a trained machine learning model, the migration plan, wherein the trained machine learning model is trained based on historical operating status of the plurality of data warehouses that indicates a degree of utilization of each of the plurality of data warehouses and historical scheduling of fresh data load to source tables associated with the one or more data objects; and receive, from the trained machine learning model and based on the input, a recommendation on a scheduling time to execute the migration plan;

after the validation, adding a sub-domain associated with a business organization to the at least one of the plurality of data warehouses;

adding a schema to the at least one of the plurality of data warehouses;

provisioning a plurality of computing resources available to one or more servers that provide the at least one of the plurality of data warehouses; and cause the at least one of the plurality of data warehouses to execute the migration plan in the production environment.

2. The computing device of claim 1, wherein the sensitive data comprises one or more of:
payment card information (PCI), or
nonpublic personal information (NPI).

3. The computing device of claim 1, wherein the instructions, when executed by the one or more processors, cause the computing device to:
prior to receiving the request to migrate, receive a request to provision the one or more data objects in the at least one of the plurality of data warehouses; and provision access to the one or more data objects in the production environment.

4. The computing device of claim 1, wherein the instructions, when executed by the one or more processors, cause the computing device to:
prior to generating the tokenization, provide, to the user device, one or more options to tokenize the sensitive data, wherein the tokenization is based on a user selection of the one or more options.

5. The computing device of claim 1, wherein the instructions, when executed by the one or more processors, cause the computing device to:
determine a plurality of dependent jobs to be executed prior to the execution of the migration plan; and wherein causing the at least one of the plurality of data warehouses to execute the migration plan comprises causing the at least one of the plurality of data warehouses to execute the migration plan after the dependent jobs have been executed successfully.

6. The computing device of claim 1, wherein the instructions, when executed by the one or more processors, cause the computing device to validate the migration plan based on data quality check using metadata information.

7. The computing device of claim 1, wherein the instructions, when executed by the one or more processors, cause the computing device to:
determine the historical operating status of the plurality of data warehouses; and
select, based on the historical operating status, a time period to execute the migration plan, wherein causing the at least one of the plurality of data warehouses to execute the migration plan comprises causing the at least one of the plurality of data warehouses to execute the migration plan during the time period.

8. A method comprising:
receiving, from a user device, a request to migrate one or more data objects from a sandbox to a production environment of at least one of a plurality of data warehouses that are provided as a service in a cloud computing environment, wherein computing resources are dynamically allocated to the plurality of data warehouses;

scanning a plurality of queries in the sandbox to determine the one or more data objects to be migrated to the production environment;

provisioning access to the one or more data objects in the production environment;

determining lineage information for each of the one or more data objects, wherein the lineage information comprises an origin of each of the one or more data objects, and a frequency with which each of the one or more data objects has been accessed;

prior to an execution of a migration plan, updating a database catalog of the at least one of the plurality of data warehouses with the lineage information;

identifying sensitive data contained within the one or more data objects;

generating a tokenization for at least a portion of the sensitive data, wherein the tokenization replaces the portion of the sensitive data with a non-sensitive token without altering a type or length of the portion of the sensitive data;

generating, based on the lineage information in the database catalog and the tokenization, a migration plan for a migration path from the sandbox to the production environment of the at least one of the plurality of data warehouses;

validating the migration plan based on data control criteria in the production environment;

providing, as input to a trained machine learning model, the migration plan, wherein the trained machine learning model is trained based on historical operating status of the plurality of data warehouses that indicates a degree of utilization of each of the plurality of data warehouses and historical scheduling of fresh data load to source tables associated with the one or more data objects;

receiving, from the trained machine learning model and based on the input, a recommendation on a scheduling time to execute the migration plan; and after the validation, adding a sub-domain associated with a business organization to the at least one of the plurality of data warehouses;

adding a schema to the at least one of the plurality of data warehouses; and provisioning a plurality of computing resources available to one or more servers that provide the at least one of the plurality of data warehouses; and causing the at least one of the plurality of data warehouses to execute the migration plan in the production environment.

9. The method of claim 8, wherein the sensitive data comprises one or more of:

payment card information (PCI), or nonpublic personal information (NPI).

10. The method of claim 8, wherein generating the tokenization comprises:

prior to generating the tokenization, providing, to the user device, one or more options to tokenize the sensitive data, wherein the tokenization is based on a user selection of the one or more options.

11. The method of claim 8, wherein causing the at least one of the plurality of data warehouses to execute the migration plan comprises:

determining a plurality of dependent jobs to be executed prior to the execution of the migration plan; and after the dependent jobs have been executed successfully, causing the at least one of the plurality of data warehouses to execute the migration plan.

12. The method of claim 8, wherein causing the at least one of the plurality of data warehouses to execute the migration plan comprises:

determining the historical operating status of the plurality of data warehouses;

selecting, based on the historical operating status, a time period to execute the migration plan; and causing the at least one of the plurality of data warehouses to execute the migration plan during the time period.

13. The method of claim 8, further comprising:

prior to receiving the request to migrate, receiving a request to provision the one or more data objects in the at least one of the plurality of data warehouses; and provisioning access to the one or more data objects in the production environment.

14. The method of claim 8, further comprising: validating the migration plan based on data quality check using metadata information.

15. One or more non-transitory computer-readable media storing instructions that, when executed by one or more processors, cause a computing device to:

receive, from a user device, a request to migrate one or more data objects from a sandbox to a production environment of at least one of a plurality of data warehouses that are provided as a service in a cloud computing environment, wherein computing resources are dynamically allocated to the plurality of data warehouses;

scan a plurality of queries in the sandbox to determine the one or more data objects to be migrated to the production environment;

provision access to the one or more data objects in the production environment;

determine lineage information indicating for each of the one or more data objects, wherein the lineage information comprises an origin of each of the one or more data objects, and a frequency with which each of the one or more data objects has been accessed;

prior to an execution of a migration plan, update a database catalog of the at least one of the plurality of data warehouses with the lineage information;

identifying sensitive data contained within the one or more data objects;

generate a tokenization for at least a portion of the sensitive data, wherein the tokenization replaces the portion of the sensitive data with a non-sensitive token without altering a type or length of the portion of the sensitive data;

generate, based on the lineage information in the database catalog and the tokenization, the migration plan for a migration path from the sandbox to the production environment of the at least one of the plurality of data warehouses;

validate the migration plan based on data control criteria in the production environment;

provide, as input to a trained machine learning model, the migration plan, wherein the trained machine learning model is trained based on historical operating status of the plurality of data warehouses that indicates a degree of utilization of each of the plurality of data warehouses and historical scheduling of fresh data load to source tables associated with the one or more data objects;

receive, from the trained machine learning model and based on the input, a recommendation on a scheduling time to execute the migration plan; and after the validation, add a sub-domain associated with a business organization to the at least one of the plurality of data warehouses;

add a schema to the at least one of the plurality of data warehouses;

provision a plurality of computing resources available to one or more servers that provide the at least one of the plurality of data warehouses; and cause the at least one of the plurality of data warehouses to execute the migration plan in the production environment.

16. The computer-readable media of claim 15, wherein the instructions, when executed by the one or more processors, cause the computing device to:

prior to generating the tokenization, provide, to the user device, one or more options to tokenize the sensitive data, wherein the tokenization is based on a user selection of the one or more options.

17. The computer-readable media of claim 15, wherein the instructions, when executed by the one or more processors, cause the computing device to:

determine a plurality of dependent jobs to be executed prior to the execution of the migration plan; and wherein causing the at least one of the plurality of data warehouses to execute the migration plan comprises causing the at least one of the plurality of data warehouses to execute the migration plan after the dependent jobs have been executed successfully.

18. The computer-readable media of claim 15, wherein the instructions, when executed by the one or more processors, cause the computing device to:

determine a historical operating status of the plurality of data warehouses; and select, based on the historical operating status, a time period to execute the migration plan, wherein causing the at least one of the plurality of data warehouses to execute the migration plan comprises causing the at least one of the plurality of data warehouses to execute the migration plan during the time period.

* * * * *